US012104415B2

(12) United States Patent
Bekendam et al.

(10) Patent No.: US 12,104,415 B2
(45) Date of Patent: Oct. 1, 2024

(54) CONTROL ARRANGEMENT FOR OPERATING A MOTOR VEHICLE LOCKING SYSTEM

(71) Applicant: Brose Fahrzeugteile SE & Co. Kommanditgesellschaft, Bamberg, Bamberg (DE)

(72) Inventors: Rene Bekendam, Remscheid (DE); Alexander Müller, Bischberg (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 162 days.

(21) Appl. No.: 17/797,456

(22) PCT Filed: Feb. 2, 2021

(86) PCT No.: PCT/EP2021/052348
§ 371 (c)(1),
(2) Date: Aug. 4, 2022

(87) PCT Pub. No.: WO2021/156218
PCT Pub. Date: Aug. 12, 2021

(65) Prior Publication Data
US 2023/0126606 A1 Apr. 27, 2023

(30) Foreign Application Priority Data
Feb. 4, 2020 (DE) ..................... 10 2020 102 775.3

(51) Int. Cl.
*E05B 81/86* (2014.01)

(52) U.S. Cl.
CPC .................................... *E05B 81/86* (2013.01)

(58) Field of Classification Search
CPC ....................................................... E05B 81/86
See application file for complete search history.

(56) References Cited

U.S. PATENT DOCUMENTS 6,883,628 B1 * 4/2005 Mizukami ........... B60R 16/0315 296/192
2003/0015049 A1 * 1/2003 Gressel .................. F16K 31/10 185/38

(Continued)

FOREIGN PATENT DOCUMENTS

DE 102014105873 A1 10/2015
DE 102020102775 A1 * 8/2021 ............. E05B 81/86
EP 29818366 A1 12/2014

OTHER PUBLICATIONS

Dictionary—Current Technical Terms from Computer Sciences and Telecommunications, 9th Edition, Zürich, VDF Hochschulverlag AG, 2007, p. 86. ISBN 978-3-7281-3108-9.

*Primary Examiner* — Mark A Williams
(74) *Attorney, Agent, or Firm* — Dickinson Wright PLLC

(57) ABSTRACT

A control arrangement for operating a motor vehicle locking system, the locking system has an electric drive with an electric drive motor, during normal operation, the electric drive is supplied with a normal supply voltage to provide a motorized locking, the control arrangement has an energy storage arrangement with a capacitor, the energy storage arrangement, in an emergency mode, provides an emergency electrical supply voltage for the electric drive, and includes a boost stage connected downstream of the energy storage unit for generating the emergency supply voltage, the boost stage boosts an electrical input voltage at an input of the boost stage to an electrical output voltage at an output of the boost stage. The energy storage arrangement, to generate the emergency supply voltage, has a first boost stage connected downstream for generating the emergency supply voltage and a second boost stage connected downstream of the first boost stage.

16 Claims, 2 Drawing Sheets

(56) References Cited

U.S. PATENT DOCUMENTS

| | | | | |
|---|---|---|---|---|
| 2008/0150319 | A1* | 6/2008 | Ray | E05F 15/70<br>296/146.1 |
| 2015/0330116 | A1* | 11/2015 | Dente | B60L 58/15<br>307/10.1 |
| 2016/0026205 | A1* | 1/2016 | Song | H02J 7/342<br>323/313 |
| 2016/0133071 | A1* | 5/2016 | Henderson | G07C 9/0069<br>70/277 |
| 2017/0341526 | A1* | 11/2017 | Marlia | B60L 3/0046 |
| 2020/0263460 | A1* | 8/2020 | Kageyama | B60R 25/403 |
| 2022/0094196 | A1* | 3/2022 | Chen | H02J 7/345 |
| 2022/0195761 | A1* | 6/2022 | Trescases | H02J 9/06 |

* cited by examiner

CONTROL ARRANGEMENT FOR OPERATING A MOTOR VEHICLE LOCKING SYSTEM

CROSS-REFERENCE TO RELATED APPLICATIONS

This application is the U.S. National Phase of PCT Application No. PCT/EP2021/052348 filed on Feb. 2, 2021, which claims priority to German Patent Application No. DE 10 2020 102 775.3, filed on Feb. 4, 2020, the disclosures of which are hereby incorporated in their entirety by reference herein.

TECHNICAL FIELD

The present disclosure relates to a control arrangement for operating a motor vehicle locking system.

BACKGROUND

The motor vehicle locking system in question applies to all types of motorized locking functions for closing elements of a motor vehicle. These include for example, closing elements such as side doors, rear doors, tailgates, trunk lids, engine hoods or the like. These closing elements may in principle be designed as pivoting or sliding doors. The motorized locking function relates for example, to a motor vehicle lock assigned to the motor vehicle locking system. Further examples of the locking functions in question of a motor vehicle are drive arrangements that provide motorized adjustment of the abovementioned closing elements.

SUMMARY

The problem of control arrangements that include series-connected capacitors, is that the series-connected capacitors have a disadvantageous effect both on installation space requirements and on the production costs of the control arrangement. The series-connected capacitors additionally generally require a balancing circuit in order to ensure uniform charging of the capacitors, which likewise leads to a more complex structure of the control arrangement.

The present disclosure attempts to address this problem by designing and developing a known control arrangement for the operation of a motor vehicle locking system such that an emergency supply voltage is provided in a relatively simple manner.

The proposed control arrangement is intended for the operation of a motor vehicle locking system, and the motor vehicle locking system has an electric drive having an electric drive motor, and the electric drive is fed, during normal operation, by a normal supply voltage in order to provide a motorized locking function for an adjustable closing element of the motor vehicle. In the present case, the term "drive motor" encompasses all kinds of electric actuators, including rotary and linear actuators. The drive motor may be a rotary electric motor, which may be designed as a brushed DC motor or as a brushless DC motor.

The control arrangement has an energy storage arrangement having at least one, or only one, energy store in the form of a capacitor, and the energy storage arrangement provides an electrical emergency supply voltage for the electric drive in an emergency operating mode, such as in the event of failure of the normal supply voltage.

The energy storage arrangement has at least one boost stage, which is connected downstream of the energy store to generate the emergency supply voltage, and the boost stage boosts an electrical input voltage at an input of the boost stage into an electrical output voltage at an output of the boost stage.

The present disclosure represents a departure from the concept known from the prior art of mandatorily equipping the energy storage arrangement with multiple series-connected capacitors. And, in this case based on the consideration, instead of adapting the energy store, of developing the boost stage of the control arrangement.

In one or more embodiments, it is proposed for the energy storage arrangement, to generate the emergency supply voltage, to have a first boost stage connected downstream of the energy store for generating the emergency supply voltage and a second boost stage connected downstream of the first boost stage.

Using at least two boost stages means that the capacitor voltage of a single capacitor may already be sufficient to provide the emergency supply voltage. In contrast to using a single boost stage with a comparatively high boost factor, the provided connection of at least two boost stages in series makes it possible to increase efficiency when boosting the voltage. At the same time, it is possible to use inexpensive boost stages with a simple structure.

In another embodiment, which is particularly easy to implement, the first boost stage is identical to the second boost stage, such as with regard to the boost factor. If more than two boost stages are provided, all of the boost stages may have an identical structure. As an alternative, the first boost stage may be different from the second boost stage, such as with regard to the boost factor, as a result of which efficiency is for example able to be further improved.

In one or more embodiments, the capacitor may be in the form of a double-layer capacitor in order to achieve a high electric power density. The design-induced limitation of the maximum capacitor voltage that occurs in double-layer capacitors is not a problem with the proposed solution due to the design of the boost stages.

As another example, the proposed control arrangement makes it possible to use an energy storage arrangement having only a single capacitor, for example a single double-layer capacitor.

In an alternative embodiment, the energy storage arrangement may include at least two capacitors, such as at least two double-layer capacitors, which are connected in parallel with one another. The available capacitance is able to be increased by connecting the capacitors in parallel, for which purpose the capacitors are permanently connected in parallel with one another.

In addition, with multiple capacitors, such as capacitors connected in parallel, it is possible to create redundancy for the energy storage arrangement, and the emergency voltage supply is still able to be made available in the event of failure of a capacitor. As another example, a switching device may be provided to make it possible to switch between two capacitors of the energy storage arrangement to generate the emergency supply voltage.

Another embodiment relates to the energy storage arrangement having a buck stage that is connected upstream of the energy store to charge the energy store with the normal supply voltage. As an example, the concept proposed above for the emergency supply voltage is also adopted for the buck stage, and the energy storage arrangement has a first buck stage connected upstream of the energy store to charge the energy store and a second buck stage connected downstream of the first buck stage.

According to another embodiment, which is of significance on its own, a motor vehicle locking system that has an electric drive having an electric drive motor and a proposed control arrangement is claimed as such. Reference may be made to all statements regarding the proposed control arrangement.

In another embodiment, provision is furthermore made for a motor vehicle lock for the closing element of the motor vehicle, and the electric drive is intended for the motorized lifting of the pawl of the motor vehicle lock. As an example, this embodiment may take the special security requirements on motor vehicle locks into consideration.

According to yet another embodiment, which is likewise of significance on its own, a method for operating a motor vehicle locking system by way of a proposed control arrangement is provided. In this respect, reference may also be made to all statements regarding the proposed control arrangement.

BRIEF DESCRIPTION OF THE DRAWINGS

The invention will be explained in more detail below with reference to a drawing illustrating merely an exemplary embodiment. In the drawing

DETAILED DESCRIPTION

Figure 1:
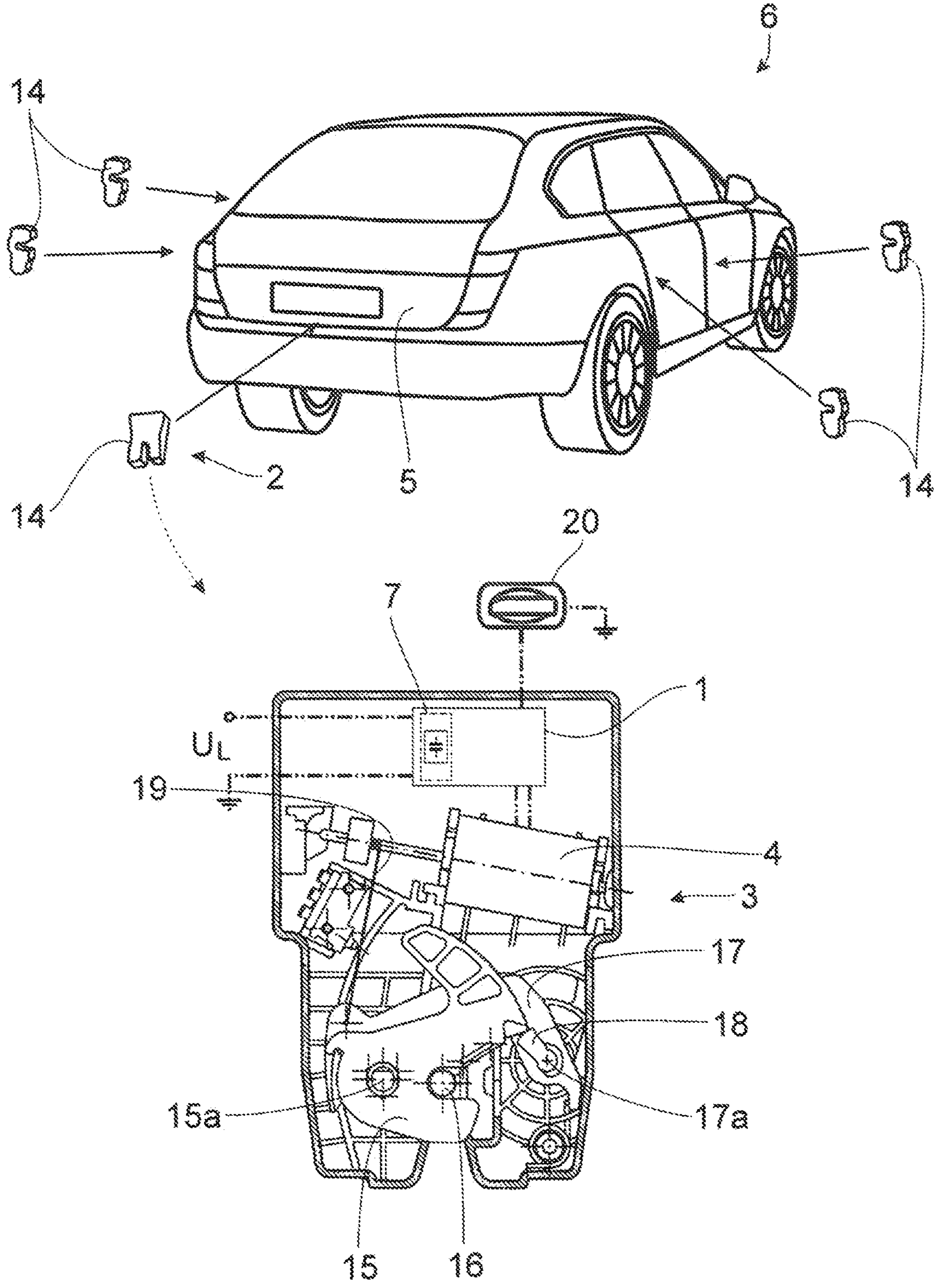
FIG. 1 shows a schematic, perspective illustration of a motor vehicle having proposed motor vehicle locking systems that have motor vehicle locks, and a motor vehicle lock in a partially disassembled side view.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known control arrangement is provided in US 2015/0330116 A1 relates to the operation of a motor vehicle locking system having a motor vehicle lock that has a lock latch and a pawl as locking elements. The lock latch is able to be brought into a locking position in which it is in holding engagement with the locking part and in which it is fixed by the pawl. The motor vehicle lock is furthermore equipped with an electric drive, by way of which the pawl is able to be lifted, such that the lock latch, releasing the locking part, is able to be moved into its open position.

In order to be able to take into consideration the requirements in terms of the safety of the voltage supply for such motor vehicle locks, the known control arrangement has a chargeable energy storage arrangement, as a result of which the electrical energy supply to the motor vehicle locking system is ensured via an emergency supply voltage even in an emergency operating mode, in particular in the event of failure of the normal supply voltage.

The energy storage arrangement of the known control arrangement is formed by capacitors. Since individual capacitors are limited in terms of the voltage they provide, multiple capacitors are electrically connected in series to provide the emergency voltage supply. In addition, in the known control arrangement, provision is made for a boost stage for the energy storage arrangement in order to achieve the required emergency supply voltage.

According to first teaching, the present disclosure relates to a control arrangement 1 for operating a motor vehicle locking system 2. The motor vehicle locking system 2 has an electric drive 3 having an electric drive motor 4, and the electric drive 3 is fed, during normal operation, by a normal supply voltage in order to provide a motorized locking function for an adjustable locking element 5 of the motor vehicle 6.

The normal supply voltage used during normal operation is in this case a supply voltage of the on-board power system of the motor vehicle 6, which may be provided by the central battery of the motor vehicle 6. The central battery may be the battery that provides the electrical energy required to start the motor vehicle 6 and/or to drive the motor vehicle 6.

A motorized locking function should be understood to mean that the adjustable closing element 5 of the motor vehicle 6 is adjusted directly or indirectly by movement generated by the electric drive 2, is opened or closed, and/or is locked or unlocked.

With regard to the design of the closing element 5, reference may be made to the introductory statements, and, here in FIG. 1, the functioning of the motor vehicle locking system 2 is illustrated for a closing element 5 in the form of a tailgate. However, all statements likewise apply to all other types of closing elements 5 of the motor vehicle 6.

FIG. 2*a*) and b) show illustrations of the control arrangement 1, and only components for the provision, explained below, of an emergency supply voltage $U_N$ are reproduced for the sake of simplification. The control arrangement 1 may furthermore have an electronic control system, not illustrated, for implementing the control tasks that arise in connection with the motorized locking functions. The control arrangement 1 is for example, in this case designed to control the electric drive 3.

Figure 2:
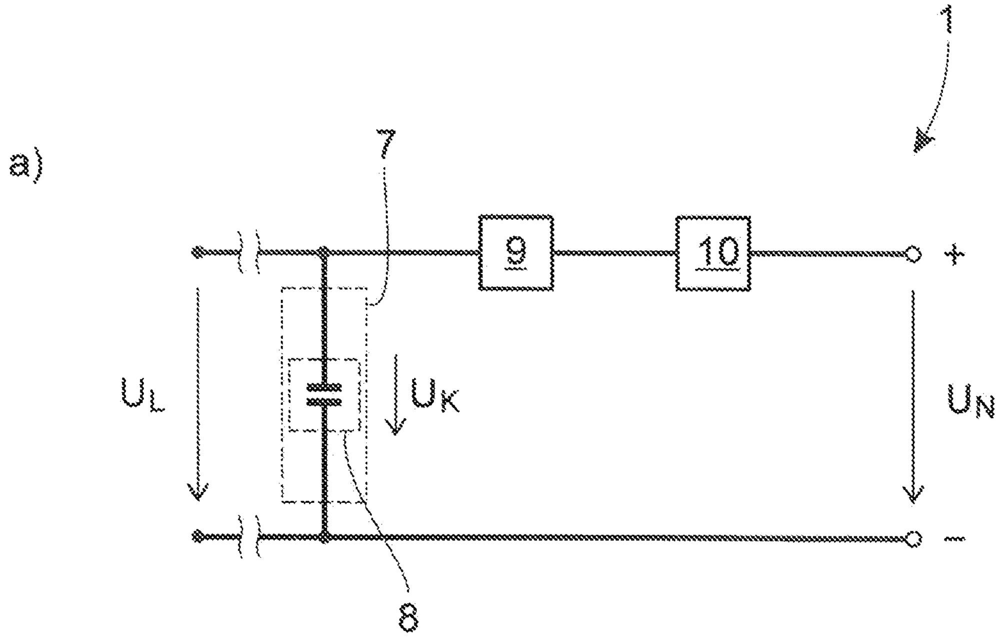
FIG. 2 shows a schematic illustration of the proposed control arrangement a) according to a first embodiment and b) according to a second embodiment.
Figure 2:
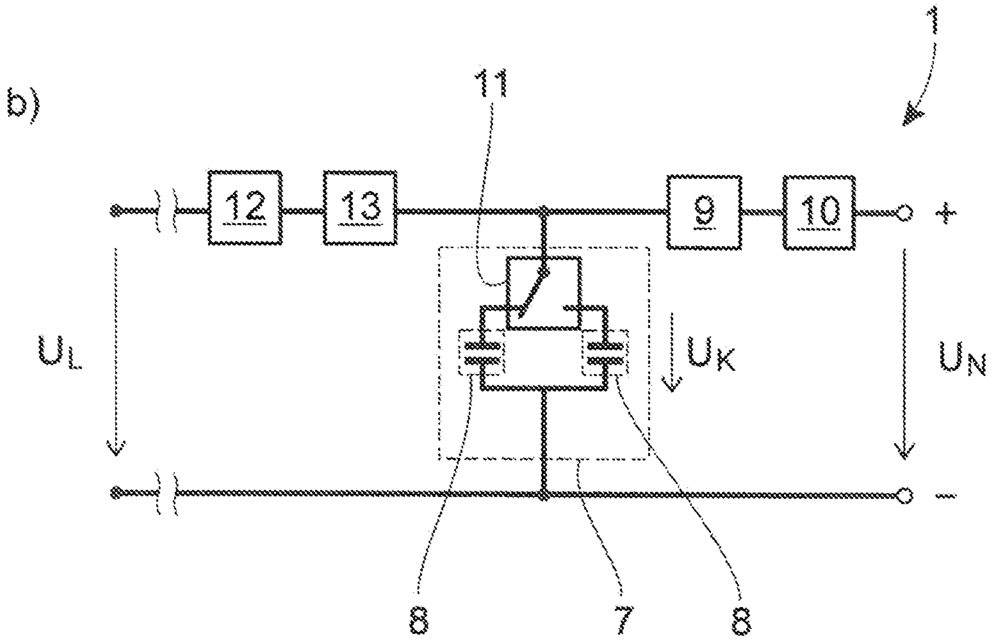

As may be seen from FIG. 2, the control arrangement 1 has an energy storage arrangement 7 having at least one energy store in the form of a capacitor 8, and the energy storage arrangement 7 provides an electrical emergency supply voltage $U_N$ for the electric drive 3 in an emergency operating mode, such as in the event of failure of the normal supply voltage. The emergency supply voltage $U_N$ is in this case provided based on the capacitor voltage $U_K$ of the at least one capacitor 8, as will be explained further below.

The electric drive 3 is generally matched to the normal supply voltage, and for example, to the voltage of the central battery of the motor vehicle 6, with regard to the required drive voltage. The capacitor voltage $U_K$ of the capacitor 8 is in this case lower than the normal supply voltage. The energy storage arrangement 7 has at least one boost stage 9, 10, which is connected downstream of the energy store to generate the emergency supply voltage $U_N$. The boost stage 9, 10 in this case boosts an electrical input voltage at an input of the boost stage 9, 10 into an electrical output voltage at an output of the boost stage 9, 10, such that the output voltage is higher than the electrical input voltage.

It is then essential that the energy storage arrangement 7, to generate the emergency supply voltage $U_N$, has a first boost stage 9 connected downstream of the energy store for generating the emergency supply voltage $U_N$ and a second boost stage 10 connected downstream of the first boost stage 9.

The first and second boost stage 9, 10 may be connected in series such that the boost factors of the first and second boost stage 9, 10 are for example, multiplied by one another. The boost factor is understood to mean the ratio between the electrical output voltage and the electrical input voltage of a boost stage 9, 10. Since, according to the proposal, provision is made for at least two boost stages 9, 10 for generating the emergency supply voltage based on the capacitor voltage $U_K$, it is possible, on the one hand, to overcome a large voltage difference between capacitor voltage $U_K$ and required emergency supply voltage $U_N$. On the other hand, lower demands may be placed on the respective design of the boost stages 9, 10.

In principle, more than two boost stages 9, 10 may also be connected in series, and for example a third boost stage is additionally connected downstream of the second boost stage 10 to generate the emergency supply voltage $U_N$. However, according to one embodiment illustrated in FIG. 2, exactly two boost stages 9, 10 are provided.

The boost stages 9, 10 may be designed as mutually independently designed electrical components that are connected to one another in the control arrangement 1. This embodiment may be advantageous in that pre-existing electrical components may be used in the control arrangement 1 and individual boost stages 9, 10 may be retrofitted. As an alternative thereto, provision may also be made for the boost stages 9, 10 to be integrated together in an electrical component, for example in an integrated circuit.

The first boost stage 9 may be identical to the second boost stage 10, for example, with regard to the boost factor, resulting in a particularly simple structure of the control arrangement 1. As an example, the boost stages 9, 10 each consist of electrical components that are identical with regard to their electrical nominal variables and that are connected to one another in the same way so as to form the respective boost stage 9, 10.

As an alternative, the first boost stage 9 may be different from the second boost stage 10, for example, with regard to the boost factor. The efficiency of the boosting may be improved by appropriately selecting a combination of different boost stages 9, 10. Furthermore, provision may be made for a starting voltage for the respective boost stages 9, 10, this being understood to mean a minimum electrical voltage that is required for normal operation of the boost stage 9, 10. In the case of differently designed boost stages 9, 10, the first boost stage 9 in this case may have a lower starting voltage than the second boost stage 10. By way of example, the starting voltage of the second boost stage 10 may be at least twice as great as the starting voltage of the first boost stage 9.

The boost stages 9, 10 may each be constructed in different ways that are known per se. At least one of the boost stages 9, 10 may be designed as a step-up converter (boost converter). The boost stages 9, 10 may likewise be designed as a charge pump. A design of the boost stages 9, 10 with discrete boosting of the voltage based on an AC voltage is also conceivable, in which case, for example, Delon and/or Villard circuits may be provided. In the case of discrete boosting, the respective boost stage 9, 10 has an arrangement for generating an AC voltage from the input voltage, for example a chopper. In the abovementioned variant with first and second boost stages 9, 10 of different design, correspondingly different types of boost stages 9, 10 may be connected in series; for example one boost stage 9, 10 is a step-up converter and another boost stage 9, 10 is a charge pump or performs discrete boosting.

In another embodiment, the capacitor 8 is in the form of a double-layer capacitor. A double-layer capacitor is an electrochemical energy store. Energy is stored in an electrochemical double layer, which is also known as the "Helmholtz layer" ("Lexikon—Aktuelle Fachbegriffe aus Informatik and Telekommunikation" [Dictionary of modern IT and telecommunications terminology], 9th edition, 2007, VDF Hochschulverlag AG, page 86). Such a double-layer capacitor is also referred to as a "supercapacitor", "supercap", "ultracap" or the like. A double-layer capacitor is able to provide a high-power density for the motor vehicle locking system 2.

The maximum voltage provided by the capacitor for the capacitor voltage $U_K$ is for example, at most 3 V, or at most 2.7 V. The emergency supply voltage $U_N$ may for example, be an order of magnitude above the maximum voltage for the capacitor voltage $U_K$. The emergency supply voltage is for example, at least 10 V. The overall boost factor of the series-connected boost stages 9, 10 may be at least 2, or at least 5.

According to the embodiment that is illustrated in FIG. 2*a*), the energy storage arrangement 7 has a single capacitor 8, for example, a single double-layer capacitor. As already mentioned, the proposed solution makes it possible, via the boost stages 9, 10, even with the in this case correspondingly low capacitor voltage $U_K$, to guarantee the provision of the emergency supply voltage $U_N$.

In an alternative embodiment illustrated in FIG. 2*b*), the energy storage arrangement 7 has at least two capacitors 8, for example, at least two double-layer capacitors, which are connected in parallel with one another. It is therefore possible to provide an increased capacitance in comparison with one capacitor 8.

In a further, particularly simple embodiment, provision is made for the capacitors 8 to be permanently connected in parallel with one another, such that the full capacitance is always made available in the emergency operating mode.

However, as illustrated in FIG. 2*b*), provision may be made for a switching device 11, by way of which it is possible to switch between two capacitors 8 of the energy storage arrangement 7 to generate the emergency supply voltage $U_N$. The switching device 11 may for example, switch the capacitors 8 based on the state of charge of the capacitors 8 and, for example, switch the capacitor 8 with the higher state of charge to generate the emergency supply voltage $U_N$. It is also conceivable for a second capacitor 8 to be switched to generate the emergency supply voltage $U_N$ when the state of charge of a first capacitor 8 falls below a minimum value.

According to a further embodiment, the control arrangement 1 is designed to charge the energy store. As illustrated in FIG. 2*b*), the energy storage arrangement 7 may include at least one buck stage 12, 13 that is connected upstream of the energy store to charge the energy store with the normal supply voltage, which is identified in FIG. 2*b*) as the charging voltage UL. The buck stage 12, 13 steps down an electrical input voltage at an input of the buck stage 12, 13 into an electrical output voltage at an output of the buck stage 12, 13.

As an example, the energy storage arrangement 7 may have a first buck stage 12 connected upstream of the energy store for charging the energy store and a second buck stage 13 connected downstream of the first buck stage 12. In this case too, the buck stages 12, 13 may for example have an identical or different design. Reference may be made to the above statements regarding the boost stages 9, 10, which also apply correspondingly to the buck stages 12, 13.

According to further teaching, which is of significance on its own, the abovementioned motor vehicle locking system 2 that has an electric drive 3 having an electric drive motor 4 and a proposed control arrangement 1 is claimed as such. In this respect, reference may be made to all above statements.

Here and according to another embodiment of the motor vehicle locking system 2, provision is made for a motor vehicle lock 14 for the closing element 5 of the motor vehicle 6, and the motor vehicle lock 14 is illustrated in FIG. 1 in a partially disassembled side view. The motor vehicle lock 14 is equipped with a lock latch 15, able to pivot about a lock latch axis 15*a*, for holding engagement with a locking part 16, and a pawl 17, assigned to the lock latch 15 and able to pivot about a pawl axis 17*a*. The locking part 16 may be a locking bracket, a locking bolt or the like. By way of example, the motor vehicle lock 14 is arranged on a closing element 5, while the locking part 16 is arranged fixed on the body of the motor vehicle 6.

The pawl 17 is able to be brought into a dropped position, illustrated in FIG. 1, in which it holds the lock latch 15 in the illustrated locked position by way of a pawl mandrel 18. The pawl 17 is also able to be lifted in a motorized manner by way of the electric drive 3. For this purpose, the drive motor 4 may be connected to the pawl 17 by a drive cable 19. The motorized lifting of the pawl 17 in FIG. 1 is a pivoting of the pawl 17 clockwise about the pawl axis 17*a*. The pawl 17 may in principle also be part of a pawl system consisting of two or more sequentially arranged pawls and assigned to the lock latch 15.

The motorized lifting of the pawl 17 is triggered for example by actuating a door handle 20. For this purpose, the door handle 20 is equipped with a sensor or the like, which detects actuation of the door handle 20 and forwards the detection, via a control connection, to the control arrangement 1, which brings about actuation of the electric drive 3.

In addition to or instead of the locking function of the motor vehicle lock 14 explained in more detail here, the motor vehicle locking system 2 may likewise have a drive arrangement for the motorized adjustment of an abovementioned closing element 5 of the motor vehicle, and the drive arrangement is used for the motorized adjustment, for example, opening and/or closing, of the closing element 5. Other examples of locking functions are the motorized adjustment of operating elements such as operating levers, door handles and interior elements and exterior elements of the motor vehicle, such as fan elements, interior mirrors, side mirrors, lighting or the like.

According to further teaching, which is likewise of significance on its own, a method for operating a motor vehicle locking system 2 by way of a proposed control arrangement 1 is claimed as such. Reference may be made to all statements regarding the proposed control arrangement 1 and the proposed motor vehicle locking system 2. It is essential that the energy storage arrangement 7 has a first boost stage 9 and a second boost stage 10 and that the emergency supply voltage $U_N$ is generated by the first boost stage 9 connected downstream of the energy store for generating the emergency supply voltage $U_N$ and the second boost stage 10 connected downstream of the first boost stage 9.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMBERS

1 control arrangement
2 motor vehicle locking system
3 electric drive
4 drive motor
5 closing element
6 motor vehicle
7 energy storage arrangement
8 capacitor
9 first boost stages
10 second boost stages
11 switching device
12 buck stage
13 second buck stage
14 motor vehicle lock
15 lock latch
16 locking part
17 pawl
18 pawl mandrel
19 drive cable
20 door handle
15*a* lock latch axis
17*a* pawl axis While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A control arrangement for operation of a motor vehicle locking system, wherein the motor vehicle locking system includes an electric drive provided with an electric drive motor, wherein during normal operation the electric drive is fed by a normal supply voltage in order to provide a motorized locking function for an adjustable closing element of the motor vehicle, the control arrangement comprising:

an energy storage arrangement configured to provide an emergency supply voltage to the electric drive during in an emergency operating mode, the energy storage arrangement provided with, at least one energy store including a number of capacitors, at least one boost stage connected downstream of the energy store configured to generate the emergency supply voltage, wherein the boost stage is configured to boost an electrical input voltage at an input of the at least one boost stage to an electrical output voltage at an output of the at least one boost stage, wherein the at least one boost stage includes a first boost stage, connected downstream of the energy store configured to generate the emergency supply voltage, and a second boost stage connected to and disposed downstream of the first boost stage.

2. The control arrangement of claim 1, wherein the first boost stage is identical to the second boost stage.

3. The control arrangement of claim 1, wherein the number of capacitors includes a double-layer capacitor.

4. The control arrangement of claim 1, wherein the number of capacitors only includes one capacitor.

5. The control arrangement of claim 1, wherein the number of capacitors includes at least two capacitors connected parallel with one another.

6. The control arrangement of claim 5, wherein the at least two capacitors are permanently connected in parallel with one another.

7. The control arrangement of claim 5, further comprising:

a switching device configured to switch between a first capacitor and a second capacitor of the at least two capacitors to generate the emergency supply voltage.

8. The control arrangement of claim 1, wherein the energy storage arrangement includes at least one buck stage connected upstream of the energy store and configured to charge the energy store with the normal supply voltage, the buck stage configured to step down an electrical input voltage at an input of the buck stage to an electrical output voltage at an output of the buck stage.

9. The control arrangement of claim 1, wherein the energy storage arrangement includes a first buck stage, connected upstream of the energy store and configured to store the energy store, and a second buck stage connected downstream of the first buck stage.

10. A motor vehicle locking system provided with an electric drive including an electric drive motor and the control arrangement of claim 1.

11. The motor vehicle locking system of claim 10, further comprising:

a motor vehicle lock configured to lock and unlock the closing element, the motor vehicle lock including a lock latch and a pawl, the lock latch configured to hold and engage a locking part, and a pawl configured to cooperate with the lock latch, and the electric drive configured to provide motorized lifting of the pawl.

12. The control arrangement of claim 1, wherein the first boost stage has a first boost factor, and the second boost stage has a second boost factor different than the first boost factor.

13. The control arrangement of claim 1, wherein the first boost stage has a first starting voltage and the second boost stage has a second starting voltage, the first starting voltage being less than the second starting voltage.

14. The control arrangement of claim 4, wherein the one capacitor is a double layer capacitor.

15. The control arrangement of claim 5, wherein the at least two capacitors are double-layer capacitors.

16. The control arrangement of claim 1, wherein the control arrangement is configured provide the emergency supply voltage to the electric drive, in response to the control arrangement failing to feed the normal supply voltage.

* * * * *